US009883661B2

(12) United States Patent
Huntley

(10) Patent No.: US 9,883,661 B2
(45) Date of Patent: Feb. 6, 2018

(54) MULTI-PATH AQUARIUM FILTRATION APPARATUS

(71) Applicant: New PCA, LLC, Jacksonville, FL (US)

(72) Inventor: L. Ward Huntley, Orange Park, FL (US)

(73) Assignee: NEW PCA, LLC, Orange Park, FL (US)

(*) Notice: Subject to any disclaimer, the term of this patent is extended or adjusted under 35 U.S.C. 154(b) by 0 days.

(21) Appl. No.: 15/152,013

(22) Filed: May 11, 2016

(65) Prior Publication Data

US 2016/0330942 A1 Nov. 17, 2016

Related U.S. Application Data

(60) Provisional application No. 62/159,498, filed on May 11, 2015.

(51) Int. Cl.

| | |
|---|---|
| ***A01K 63/04*** | (2006.01) |
| ***C02F 1/28*** | (2006.01) |
| ***C02F 1/00*** | (2006.01) |
| *C02F 101/38* | (2006.01) |
| *C02F 101/16* | (2006.01) |
| *C02F 101/10* | (2006.01) |
| *C02F 103/20* | (2006.01) |

(52) U.S. Cl.

CPC ............ *A01K 63/045* (2013.01); *C02F 1/001* (2013.01); *C02F 1/28* (2013.01); *C02F 2101/105* (2013.01); *C02F 2101/16* (2013.01); *C02F 2101/38* (2013.01); *C02F 2103/20* (2013.01); *C02F 2301/046* (2013.01)

(58) Field of Classification Search

CPC ......... A01K 63/045; C02F 1/001; C02F 1/28; C02F 2101/38; C02F 2101/16; C02F 2101/105; C02F 2103/20; C02F 2301/046

USPC ......... 210/167.21, 167.22, 167.25, 150, 151, 210/903, 905, 906; 119/259, 260

See application file for complete search history.

(56) References Cited

U.S. PATENT DOCUMENTS 4,687,575 A 8/1987 Grose
5,006,230 A 4/1991 Votava, III et al.
5,084,164 A 1/1992 Del Rosario
5,474,673 A * 12/1995 Ludlow ................ A01K 63/045 119/260
6,641,718 B2 11/2003 Lari et al.
2007/0193956 A1 * 8/2007 Nelson .................. A01K 63/04 210/703

* cited by examiner

*Primary Examiner* — Fred Prince

(57) ABSTRACT

A multi-path aquarium filtration system having multiple chambers adapted to receive different types of treatment systems, and having a bypass gate assembly whereby the flow volume between certain chambers is adjustable.

18 Claims, 2 Drawing Sheets

20 41 103 101 40 82 80 11 22 23 13 42 84 22 21 81 100 83 12 51 92 91 93 52 101 21 102 94 10 30 50 101 54 53 61 60 70

MULTI-PATH AQUARIUM FILTRATION APPARATUS

BACKGROUND OF THE INVENTION

This invention relates generally to the field of aquarium filters, and more particularly to the field of external filter apparatuses for aquariums, wherein water to be treated is removed from the aquarium, treated by the filtration apparatus, and returned to the aquarium.

Maintaining a live animal or plant aquarium usually requires treatment of the water in order to optimize living conditions. For example, the water may need aeration, removal of protein, ammonia, phosphate and other undesirable compositions, eradication of algae and bacteria, etc. To accomplish this, aquarium filter apparatuses are utilized.

Some filter apparatuses are positioned within the tank while others are external to the tank. Some filter apparatuses are simple systems, while others are more complicated, depending on the number and type of treatment systems that are required to sustain the tank. Different combinations of treatment systems are required for different aquatic environments.

Because the treatment requirements vary, it is an object of this invention to provide a filter apparatus that is able to accommodate multiple and differing treatment systems within a single external housing, and to provide such an apparatus that is structured to provide alternative and adjustable water flow paths. It is a further object to provide such an apparatus that is modular in structure such that the unit may be separated for insertion into or removal from cabinets having obstructions which prevent insertion of the complete unit in one piece.

SUMMARY OF THE INVENTION

The invention in various embodiments is a multi-path aquarium filtration apparatus comprising a housing, an ingress receptacle to receive water drawn from the aquarium, the ingress receptacle acting as a sound reducer, a first filter receptacle comprising one or more pass-through filters, a first chamber of sufficient size to retain a significant portion of water such that a protein skimmer treatment system or similar apparatus may be retained within the first chamber, a second chamber adapted to receive a reactor type treatment system, a third chamber adapted to receive varying types of treatment systems, such as for example a cascade system, a refugium system or a live rock system, a fourth chamber adapted to retain a sponge to polish the water flowing there through, and a fifth chamber adapted to retain a pump to deliver treated water back into the aquarium.

A bypass gate assembly is provided between the second chamber and the fourth chamber, the bypass gate member being adjustable such that a controlled and adjustable volume of water passes from the second chamber directly into the fourth chamber such that the volume of water passing from the second chamber into the third chamber may be increased or decreased. The third chamber is provided with bottom outflow openings which may be opened to allow discharge of water from the bottom of the third chamber into the fourth chamber or closed such that water flows from the third chamber through an upper outflow opening into the fourth chamber.

In this manner, some of the water flows from the second chamber into the third chamber in a primary ingress flow path and the other portion of the water flows from the second chamber into the fourth chamber in a bypass flow path. As the third chamber is designed for receiving differing types of water treatment systems that require different flow volumes, the volume of water flow in the primary ingress flow path can be adjusted accordingly. Water flows from the third chamber into the fourth chamber in an upper primary exit flow path or a lower secondary exit flow path.

In a further embodiment of the multi-path aquarium filtration apparatus, the housing is provided in a modular or segmented structure, such that in the event a cabinet into which the multi-path aquarium filtration apparatus is to be placed has obstructions, such as a middle vertical column located in the cabinet opening, which precludes insertion and placement of the complete unit into the cabinet, the modules of the apparatus can be individually inserted into the cabinet and then joined by conduit fittings such that water is able to pass between the modules.

DETAILED DESCRIPTION OF THE INVENTION

Figure 1:
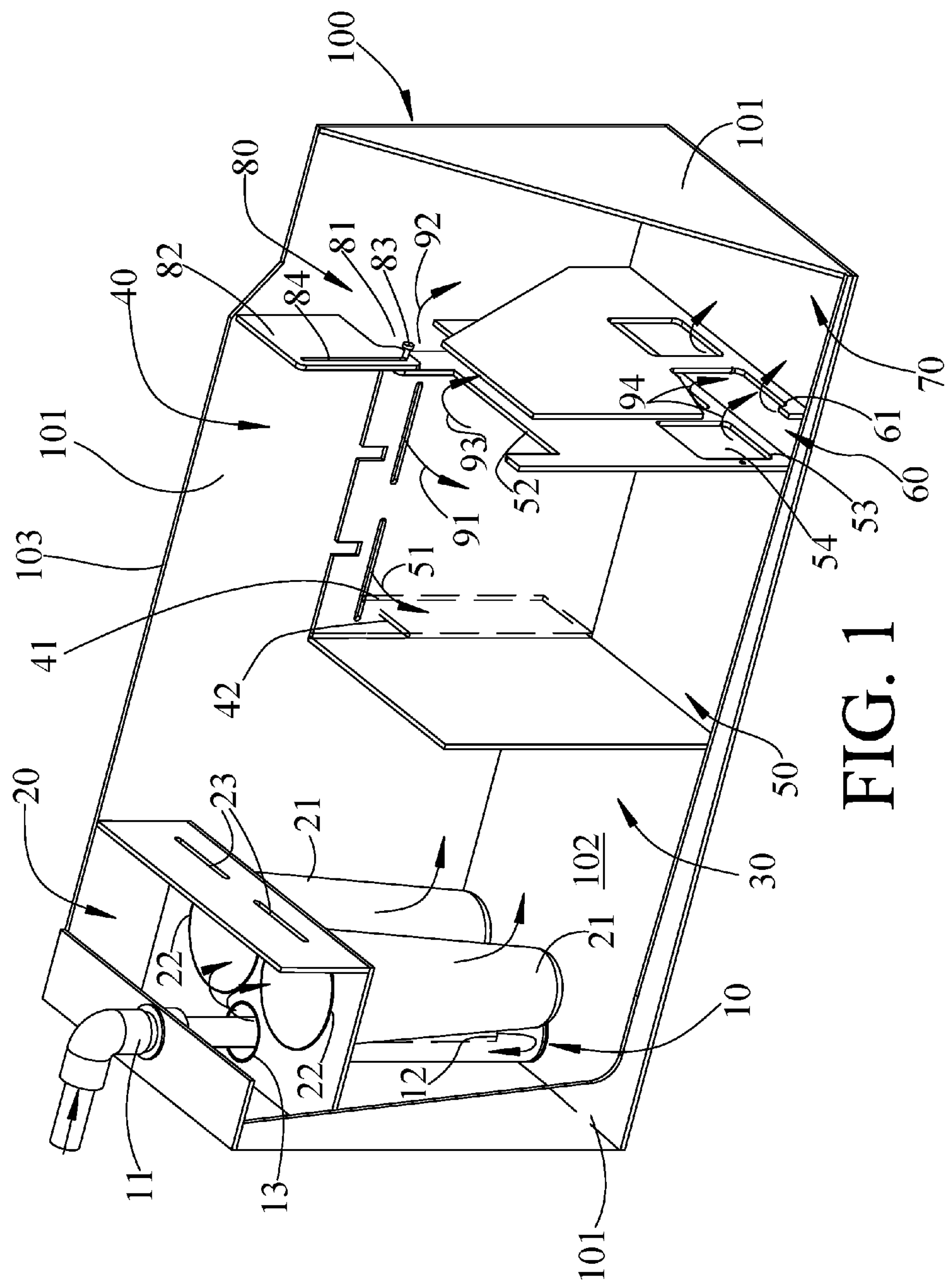
FIG. 1 is a representative illustration of an embodiment of the multi-path aquarium filter apparatus.

The invention in various embodiments is a multi-path aquarium filtration apparatus comprising a housing 100, an ingress receptacle 10 to receive water drawn from an aquarium, the ingress receptacle 10 acting as a sound or noise reducer, a first filter receptacle 20 comprising one or more pass through simple filters 21, such as sock filters, a first chamber 30 of sufficient size to retain a significant portion of water such that a protein skimmer treatment system or similar apparatus may be retained within the first chamber 30, a second chamber 40 adapted to receive a reactor type treatment system, a third chamber 50 adapted to receive varying types of treatment systems requiring differing flow volumes, such as for example a cascade system, a refugium system or a live rock system, a fourth chamber 60 adapted to retain a sponge to polish the water flowing there through to remove entrained air, and a fifth chamber 70 adapted to retain a pump to deliver treated water back into the aquarium.

The housing 100 is preferably a generally rectangular structure comprising four walls 101, a bottom 102 and an open top 103. A removable cover (not shown) is also provided. The walls 101 and bottom 102 form a watertight container and the open top 103 provides access to the interior of the housing 100. Preferably the housing 100 is composed of a transparent material such as an acrylic polymer.

One or more inflow tubes 11 deliver water from an aquarium into the ingress receptacle 10, which comprises a chamber to receive the water from the inflow tubes. The ingress receptacle 10 comprises an open top 13 and inflow tubes 11 are provided with inflow openings 12, the inflow tubes 11 being inserted deeply into the ingress receptacle 10 such that the inflow openings 12 are located near the bottom of the ingress receptacle 10. The ingress receptacle 10 may be tubular in shape as shown, or may also be configured as rectangular tubes or a single chamber for example. In this manner water flowing downward from the inflow tubes 11 is directed upward after exiting the inflow openings 12 so as to pass out through the open top 13 and into the first filter receptacle 20. With this structure, the ingress receptacle 10 acts as a noise reducer or silencer.

The first filter receptacle 20 directs the water through one or more simple filters 21, such as the sock filters illustrated, the sock filters 21 having open tops 22 whereby water passes through the sock filters 21 and into the first chamber 30. Overflow openings 23, which may comprise slots, holes or even a wall of reduced height relative to the height of the housing walls 101, provides an alternative flow path into the first chamber 30 in the event the water flow into the first filter receptacle 20 exceeds the pass-through flow of the sock filters 21.

The first chamber 30 is a relatively large, open-topped chamber sized and adapted to receive a mechanical skimmer (not shown) for removing protein from the water delivered into the first chamber 30. The water level in the first chamber 30 is maintained at a minimum eight as required by the protein skimmer by the combination of various wall members, primarily a wall of the third chamber 50.

Water then flows from the first chamber 30 into the second chamber 40. The open-topped second chamber 40 is sized and adapted to receive a reactor treatment system (not shown), such as a chemical bag or cartridge containing suspended particles to remove ammonia, phosphate or other contaminants from the water. The second chamber 40 may comprise an ingress wall 41 that defines a reactor chamber flow opening 42, which may comprise a slot or aperture in the wall 41 or which may be defined by the top of the ingress wall 41. Because of the volume of water retained within the first chamber 30, there is an elevated flow rate within the second chamber 40, which acts to suspend, agitate and move the particles of the reactor treatment system.

The third chamber 50 is disposed adjacent the second chamber 40, preferably along the long side of the second chamber 40, whereby water may flow from the open top of the second chamber 40 into the third chamber 50 on a primary ingress flow path 91 through ingress openings 51, which may comprise a reduced wall section, slots, apertures or the like positioned on the upper portion of the third chamber 50. The third chamber 50 is sized and adapted to receive differing types of treatment systems (not shown), such as for example a cascade system, a refugium system or a live rock system. For the refugium and the live rock systems, the third chamber 50 is provided with an upper outflow opening 52, which may comprise a reduced wall section, slots, apertures or the like positioned on the upper portion of the third chamber 50, such that water from the third chamber 50 flows into the fourth chamber 60 along a primary exit flow path 93. For a cascade system, which requires a low volume flow of water trickling down and across bioballs or the like, the third chamber 50 is provided with bottom outflow openings 53, disposed near the bottom of the third chamber 50, which may be opened by removing a dam member 54. With the bottom outflow openings 53 unblocked, water flows from the third chamber 50 into the fourth chamber 60 along lower secondary exit flow path 94.

A bypass gate assembly 80 is positioned between the second chamber 40 and the fourth chamber 60, the bypass gate assembly comprising a bypass opening 81 which is partially or totally obstructed by an adjustable dam member 82. Dam member 82 may be raised or lowered by an opening control member 83 disposed within an opening control slot 84. With this structure, a portion of the water leaving the second chamber 40 may be directed past the third chamber 50 and into the fourth chamber along bypass flow path 92. The bypass gate assembly 80 is adjustable such that the amount of water passing from the second chamber 40 directly into the third chamber 50 may be increased or decreased. Increasing the open area of the bypass opening 81 allows more water to bypass the third chamber 50, thereby reducing the volume of water entering the third chamber 50. Decreasing the open area of the bypass opening 81 or closing it off completely increases the volume of water entering the third chamber 50.

In this manner, water flows from the second chamber 40 into the third chamber 50 along a primary ingress flow path 91 and water flows from the second chamber 40 into the fourth chamber 60 along a bypass flow path 92. Water flows from the third chamber 50 into the fourth chamber 60 along an upper primary exit flow path 93 or a lower secondary exit flow path 94, or potentially as a combination of both flow paths 93 and 94.

Fourth chamber 60 is sized and adapted to receive a polishing sponge or like member (not shown) that traps and removes entrained air bubbles from the water. The water then passes through outflow openings 61 into the fifth chamber 70. The fifth chamber 70 is sized and adapted to receive a water pump (not shown) for delivering the treated water back to the aquarium.

With this structure, the multi-path aquarium filtration apparatus is capable of receiving different combinations and types of water treatment systems as required. The water flow paths and the water flow volume can be adjusted as required dependent upon the particular treatment systems disposed within the third chamber 50. Thus, the multi-path aquarium filtration apparatus provides a filtration system adaptable and customizable to many different aquarium environments.

Figure 2:
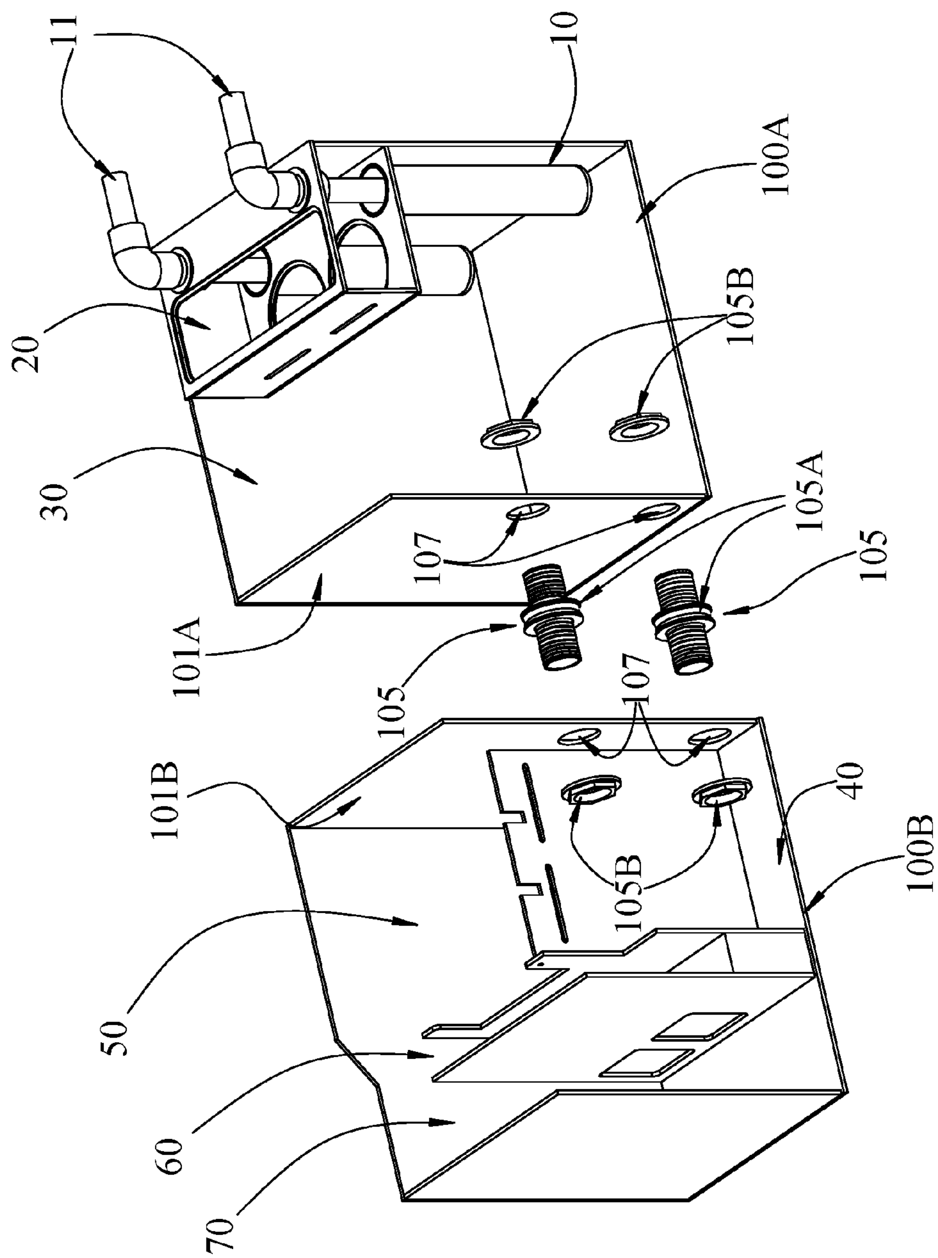
FIG. 2 is a representative illustration of an alternative embodiment of the multi-path aquarium filter apparatus in modular form.

In many circumstances the multi-path aquarium filtration apparatus will be retained within a cabinet, the cabinet usually having an opening covered by one or two hinged doors. In certain cabinets, a centrally located vertical obstruction is present, such that a pair of smaller openings are provided in the cabinet rather than a single large one. This structure sometimes prevents insertion of the multi-path aquarium filtration apparatus as shown in FIG. 1. Therefore, in an alternative embodiment of the multi-path aquarium filtration apparatus, as shown in FIG. 2, the apparatus is provided in modular or segmented form. The housing 100 is produced in two separate modules 100A and 100B which can be joined in a fluid communicating manner. Module 100A comprises the ingress receptacle 10, the first filter receptacle 20 and the first chamber 30. A fourth wall 101A is present, the fourth wall 101A becoming an interior wall when the modules 100A and 10B are joined. Module 100B comprises the second chamber 40, the third chamber 50, the fourth chamber 60 and the fifth chamber 70. Module 100B also is provided a fourth wall 101B.

The fourth walls 101A and 101B are each provided with a fitting opening 107, the fitting openings 107 being aligned coaxially when the modules 100A and 100B are joined. A conduit fitting 105 is provided of a type that secures the two modules 100A and 100B together while simultaneously providing a fluid passageway from module 100A into module 100B. As shown, the conduit fitting 105, often called a bulkhead fitting, may comprise a central member 105A having a pair of threaded tubes extending from a central flange, such that a bore extends completely through the central member 105A. With the central member 105A inserted into the fitting openings 107, a threaded nut 105B is mounted onto each of the tubes of the central member 105A and tightened to secure the modules 100A and 100B tightly together. Water is then able to pass from the first chamber 30 into the second chamber 40. The conduit fitting 105 may also comprise tubing or piping, rigid or flexible.

It is understood that equivalents and substitutions for certain elements set forth above, and therefore the true scope and definition of the invention is to be as set forth in the following claims. The embodiments described and illustrate herein are not meant to be limiting.

I claim:

1. A multi-path aquarium filtration system comprising:

a noise-reducing ingress receptacle receiving water from an aquarium into said system;

a first filter receptacle comprising filters, said first filter receptacle receiving said water from said ingress receptacle;

a protein-removing first chamber, said first chamber receiving said water from said first filter receptacle;

a second chamber adapted to retain a reactor treatment system, said second chamber receiving said water from said first chamber;

a third chamber adapted to retain a water treatment system, said third chamber receiving said water from said second chamber;

a fourth chamber receiving said water from said second chamber and from said third chamber;

a fifth chamber receiving said water from said fourth chamber, said fifth chamber adapted to retain a return pump to deliver said water back to the aquarium; and an adjustable bypass gate assembly disposed between said second chamber and said fourth chamber, whereby the amount of said water passing from said second chamber to said fourth chamber may be increased or decreased, thereby decreasing or increasing the amount of said water passing from said second chamber to said third chamber.

2. The system of claim 1, wherein said third chamber further comprises an upper outflow opening, a bottom outflow opening, and a dam member, whereby said bottom outflow opening may be closed by said dam member such that said water flows into said fourth chamber through said upper outflow opening, or may be opened by said dam member such that said water flows into said fourth chamber through said bottom outflow opening.

3. The system of claim 2, wherein said water flowing from said second chamber into said third chamber defines a primary ingress flow path, and wherein said water flowing from said second chamber into said fourth chamber defines a bypass flow path.

4. The system of claim 3, wherein said water flowing from said third chamber into said fourth chamber through said upper outflow opening defines a primary exit flow path, and wherein said water flowing from said third chamber into said fourth chamber through said bottom outflow opening defines a secondary exit flow path.

5. The system of claim 1, wherein said first filter receptacle comprises one or more sock filters; wherein said first chamber is adapted to retain a protein skimmer; wherein said reactor treatment system of said second chamber comprises a chemical bag or cartridge containing suspended particles capable of removing ammonia, phosphate or other contaminants from said water; wherein said third chamber is adapted to retain a cascade system, a refugium system or a live rock system; and wherein said fourth chamber is adapted to retain a polishing sponge.

6. The system of claim 1, said system further comprising a pair of separable housing modules, one of said housing modules comprising said ingress receptacle, said first filter receptacle and said first chamber, and the other of said housing modules comprising said second chamber, said third chamber, said fourth chamber and said fifth chamber; wherein said housing modules are joined to each other by a conduit fitting whereby said water passes from said first chamber into said second chamber through said conduit fitting.

7. The system of claim 6, wherein said conduit fitting comprises a central member having a pair of threaded tubes extending from a central flange and a pair of threaded nuts received by said tubes.

8. A multi-path aquarium filtration system comprising:

a first filter receptacle comprising filters, said first filter receptacle receiving water from an aquarium;

a first chamber, said first chamber receiving said water from said first filter receptacle;

a second chamber, said second chamber receiving said water from said first chamber;

a third chamber, said third chamber receiving said water from said second chamber, a fourth chamber receiving said water from said second chamber and from said third chamber; and an adjustable bypass gate assembly disposed between said second chamber and said fourth chamber, whereby the amount of said water passing from said second chamber to said fourth chamber may be increased or decreased, thereby decreasing or increasing the amount of said water passing from said second chamber to said third chamber.

9. The system of claim 8, said first chamber being a protein-removing chamber; said second chamber adapted to retain a reactor treatment system; and said third chamber adapted to retain a water treatment system.

10. The system of claim 8, wherein said third chamber further comprises an upper outflow opening, a bottom outflow opening, and a dam member, whereby said bottom outflow opening may be closed by said dam member such that said water flows into said fourth chamber through said upper outflow opening, or may be opened by said dam member such that said water flows into said fourth chamber through said bottom outflow opening.

11. The system of claim 10, wherein said water flowing from said second chamber into said third chamber defines a primary ingress flow path, and wherein said water flowing from said second chamber into said fourth chamber defines a bypass flow path.

12. The system of claim 11, wherein said water flowing from said third chamber into said fourth chamber through said upper outflow opening defines a primary exit flow path, and wherein said water flowing from said third chamber into said fourth chamber through said bottom outflow opening defines a secondary exit flow path.

13. The system of claim 9, wherein said first filter receptacle comprises one or more sock filters; wherein said first chamber is adapted to retain a protein skimmer; wherein said reactor treatment system of said second chamber comprises a chemical bag or cartridge containing suspended particles capable of removing ammonia, phosphate or other contaminants from said water; wherein said third chamber is adapted to retain a cascade system, a refugium system or a live rock system; and wherein said fourth chamber is adapted to retain a polishing sponge.

14. The system of claim 8, said system further comprising a pair of separable housing modules, one of said housing modules comprising said first filter receptacle and said first chamber, and the other of said housing modules comprising said second chamber, said third chamber, and said fourth chamber; wherein said housing modules are joined to each other by a conduit fitting whereby said water passes from said first chamber into said second chamber through said conduit fitting.

15. The system of claim 14, wherein said conduit fitting comprises a central member having a pair of threaded tubes extending from a central flange and a pair of threaded nuts received by said tubes.

16. The system of claim 8, further comprising a noise-reducing ingress receptacle receiving said water from the aquarium prior to said first filter receptacle.

17. The system of claim 8, further comprising a fifth chamber receiving said water from said fourth chamber, said fifth chamber adapted to retain a return pump to deliver said water back to the aquarium.

18. The system of claim 16, further comprising a fifth chamber receiving said water from said fourth chamber, said fifth chamber adapted to retain a return pump to deliver said water back to the aquarium.

* * * * *